US008558788B2

(12) United States Patent
Mathai et al.

(10) Patent No.: US 8,558,788 B2
(45) Date of Patent: Oct. 15, 2013

(54) DIFFUSING LIGHT OF A LASER

(75) Inventors: Sagi Varghese Mathai, Palo Alto, CA (US); Min Hu, Sunnyvale, CA (US); Huel Pel Kuo, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 212 days.

(21) Appl. No.: 13/066,994

(22) Filed: Apr. 29, 2011

(65) Prior Publication Data

US 2012/0274559 A1    Nov. 1, 2012

(51) Int. Cl.
*G02B 27/20* (2006.01)
(52) U.S. Cl.
USPC .......................................................... 345/156
(58) Field of Classification Search
USPC .................................................. 345/158, 156
See application file for complete search history.

(56) References Cited

U.S. PATENT DOCUMENTS

| | | | |
|---|---|---|---|
| 6,210,864 B1 * | 4/2001 | Sousa | 430/302 |
| 7,565,084 B1 | 7/2009 | Wach et al. | |
| 7,746,475 B2 | 6/2010 | Park et al. | |
| 2001/0012429 A1 | 8/2001 | Wach et al. | |
| 2005/0100267 A1 * | 5/2005 | Yoo et al. | 385/16 |
| 2009/0161100 A1 | 6/2009 | Minot et al. | |
| 2010/0210952 A1 | 8/2010 | Taira et al. | |
| 2010/0247047 A1 | 9/2010 | Filippov et al. | |
| 2011/0292157 A1 * | 12/2011 | Ghauri | 347/255 |

* cited by examiner

*Primary Examiner* — Quan-Zhen Wang
*Assistant Examiner* — Tony Davis
(74) *Attorney, Agent, or Firm* — Neel Patel

(57) ABSTRACT

Embodiments disclosed herein relate to diffusing light of a multi-mode laser. In one embodiment, the multi-mode laser projects a plurality of modes of light and a diffuser reflects the plurality of modes of light to output a single lobe of light.

16 Claims, 5 Drawing Sheets

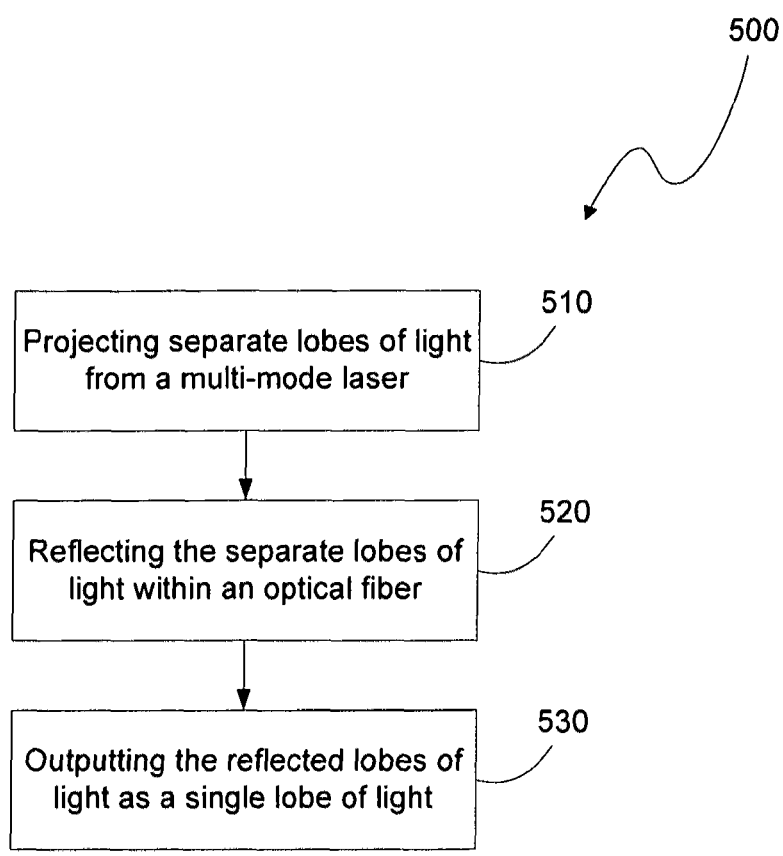

DIFFUSING LIGHT OF A LASER

BACKGROUND

High-power lasers are recently being used in a variety of applications, such as motion sensing. Examples of high-power lasers may include edge emitting lasers and/or surface emitting lasers. A laser beam emission of the high-power lasers may have different properties than that of other lasers. Manufacturer or users of such high-power lasers may be challenged to accommodate for these different properties.

BRIEF DESCRIPTION OF THE DRAWINGS

The following detailed description references the drawings, wherein:

FIG. 5 is a flowchart of an example method for diffusing light.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A high-power laser, such as an edge emitting laser and/or a surface emitting laser may have a distorted laser beam emission when operating at a high power due to, for example, emission of multiple modes of light. As a result, the laser beam emission from the high-power laser may have a relatively non-homogeneous distribution. As the laser beam propagates from the high-power laser, the laser beam may have an increasingly non-homogeneous distribution due to, for example, diffraction. For instance, the laser beam may be emitted from the high-power laser as multiple lobes of light, instead of a single lobe of light. The multiple lobes of light may appear as separate laser beams to a detector configured to detect the laser beam. As a result, the detector may not detect or inaccurately detect properties of the laser beam, such as a time of flight of the laser beam. A laser emitting such a laser beam may be referred to as a multi-mode laser.

Thus, applications using such a laser beam, such as three-dimensional motion sensing technology along a surface of a display, may not accurately detect a position or movement of an object. For example, a distance between the object and the surface of the display may not be correctly sensed.

Embodiments may provide a device and/or method to reduce or prevent the distortion of the laser beam by diffusing the laser beam through an optical fiber. Thus, the laser beam may be more accurately detected, for example, as a single lobe or single beam of light, even at further distances, such as at a detector positioned next to the surface of the display.

Figure 1A:
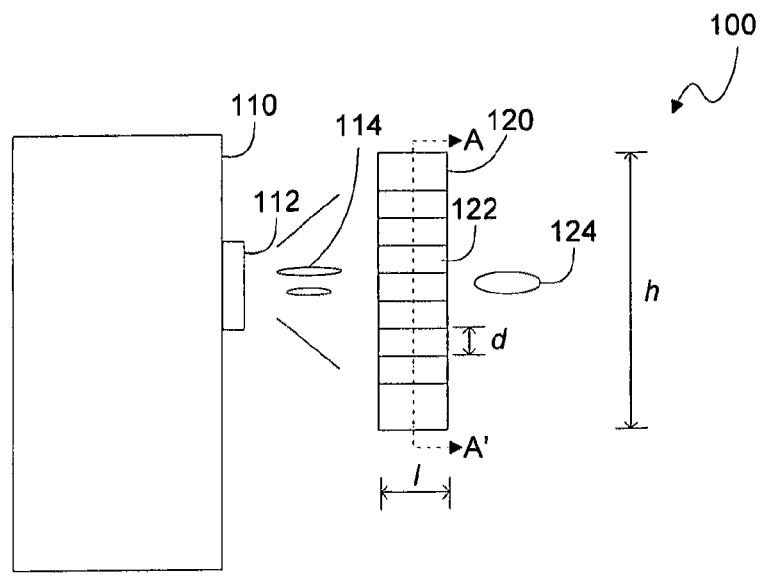
FIG. 1A is a block diagram of a side view of an example diffusing device including a cross-sectional view of a diffuser.

Referring now to the drawings, FIG. 1A is a block diagram of a side view of an example diffusing device 100 including a cross-sectional view of a diffuser 120. In the embodiment of FIG. 1, the diffusing device 100 further includes a multi-mode laser 110 to emit a plurality of modes of light perpendicular to a face of a laser diode (not shown) included in the multi-mode laser 110. For example, the multi-mode laser 110 may be a laser including a surface emitting laser diode, such as a high power vertical-cavity surface-emitting laser (VCSEL) or edge-emitting semiconductor laser. When laser beam or light emission from the multi-mode laser 110 has a different profile and/or orientation relative to a volume/shape of the cavity of the laser diode (not shown) of the multimode laser 110, the laser beam may have the plurality of modes of light. Further, a null space may form due to diffraction and interference of the plurality of laser modes in a far field, resulting in the plurality of modes of light to appear as separate lobes of light 114 at the far field.

In FIG. 1A, the null space may refer to a gap in the laser beam or empty space shown between the separate lobes of light 114 at the far field before entering the diffuser 120. However, the null space in the far field in FIG. 1A has been exaggerated for clarity, and therefore not drawn to scale. Generally, the null space may form and/or increase as the plurality of modes of light continue to propagate, due to a divergent angle of the laser beam. As a result, the term far field may also refer to a distance away from the multi-mode laser 110 at which the null space is large enough to cause errors and/or irregularities in detecting a strength of the laser beam.

The plurality of modes of light may be emitted, for example, when a size of the laser diode is expanded in the lateral and/or longitudinal direction, when the DC bias current on the laser is increased, or when the laser is operated to generate pulses.

In FIG. 1A, the multi-mode laser may pulse the plurality of modes of light at a relatively high frequency and at a relatively high power, such as a frequency of at least 10 picoseconds (ps) and at a power greater than 100 milliwatts (mW). However, embodiments of the multi-mode laser 110 may also include other frequencies and/or power ranges.

In FIG. 1A, the multi-mode laser 110, includes an aperture 112 from which the plurality of modes of light are emitted. The diffuser 120 includes one or more optical fibers 122 having first and second ends, the plurality of modes of light are to enter through the first end as the separate lobes of light 114. Further, the plurality of separate lobes of light 114 are to reflect within the optical fiber 122 and to scramble into a single lobe of light 124 after exiting the second end, as explained in greater detail with respect to FIGS. 2A and 2B. The single lobe of light 124 may have a generally homogeneous distribution and varying intensity of light that is independent of an emission power and a number of modes of light of the multi-mode laser 110. The optical fiber 122 may be any type of material known in the art, such as a type of glass or a plastic, to transmit light between the first and second ends of the optical fiber 122.

In FIG. 1A, the diffuser 120 may have a length l of approximately between 1 millimeter (mm) and 25 mm. A height h of the diffuser may be sufficient to cover the aperture 112 and/or capture the plurality of modes of light. The optical fibers 122 may be approximately between 1 and 10 micrometers (μm) in diameter d. However, embodiments of the diffuser 120 are not limited thereto and may have various different heights h, lengths l, and diameters d.

Further, the diffuser 120 may be arranged to protect and/or cover an emission surface of the multi-mode laser 110 by, for example, overlapping at least part of the aperture 112. As a result, damage or scratches to the emission surface of the multi-mode laser 110 may be prevented or reduced.

Figure 1B:
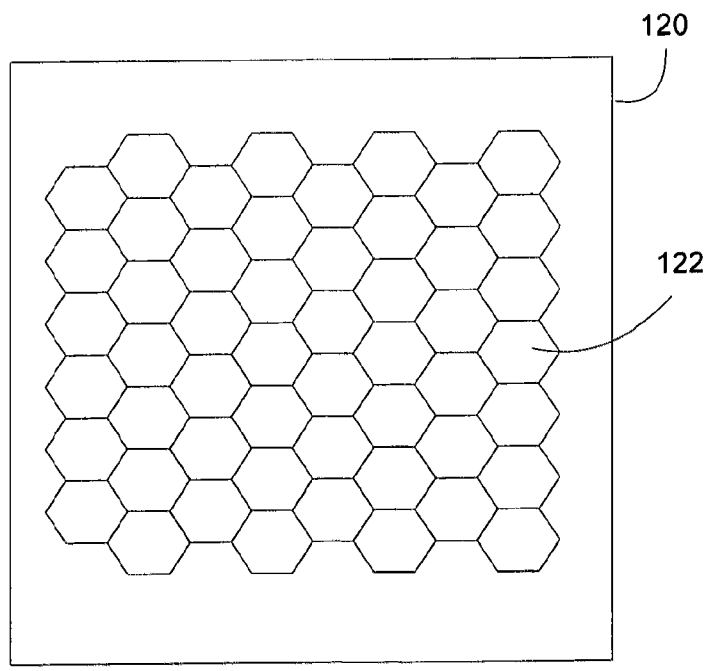
FIG. 1B is a diagram of a cross-sectional view of the diffuser taken along the line A-A' of FIG. 1A.

FIG. 1B is a diagram of a cross-sectional view of the diffuser 120 taken along the line A-A' of FIG. 1A. In FIG. 1B, the optical fibers 122 are shown to have a hexagon shaped cross-section. However, a cross-section of the optical fibers 122 may be polygonal, elliptical, irregular and/or the like. For example, the optical fibers 122 may be octagonal, hexagonal, square, rectangular, circular, etc. Further, the optical fibers 122 are shown to be relatively closely packed together to intercept the laser beam. However, embodiments may include the optical fibers 122 to be more or less closely packed, for example, depending on the shape of the optical fibers and/or a desired transmittance.

Though the diffuser 120 shown in FIGS. 1A and 1B includes a plurality of optical fibers 122, embodiments may range from a single optical fiber 122, to a higher concentration of optical fibers 122 than that shown in FIG. 1B. Moreover, FIG. 1B may only represent a portion of the diffuser 120 shown in FIG. 1A. For example, in one embodiment, the diffuser 120 may include approximately 400 fibers arranged along a symmetrical grid. The optical fibers 122 in FIG. 1B have been arranged uniformly, but embodiments of the pattern 120 may also have the optical fibers 122 arranged randomly or according to any other type of distribution known in the art. For example, the optical fibers 122 may be arranged symmetrically, asymmetrically, and the like. In addition, the optical fibers 122 may be arranged according to a repeating or non-repeating pattern.

Figure 2A:
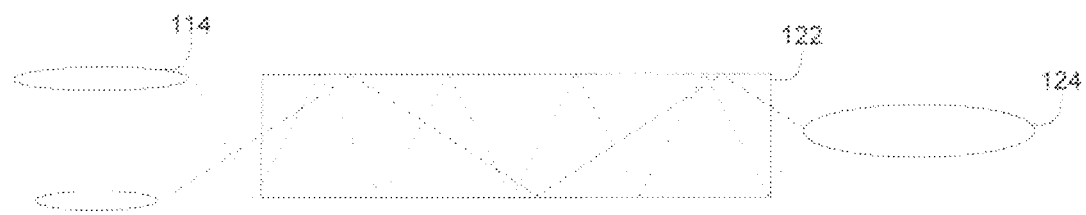
FIG. 2A is a more detailed diagram of an example optical fiber of the diffuser of FIG. 1A.
Figure 2B:
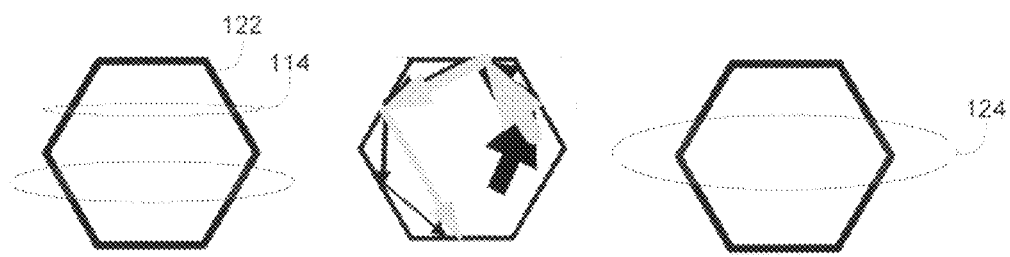
FIG. 2B is a more detailed diagram of the example optical fiber of the diffuser of FIG. 1B.

FIG. 2A is a more detailed diagram of the example optical fiber 122 of the diffuser 120 of FIG. 1A. FIG. 2B is a more detailed diagram of the example optical fiber 122 of the diffuser 120 of FIG. 1B. In both FIGS. 2A and 2B, the separate lobes of light 114 are shown to reflect along an interior surface of the optical fiber 122. As shown in FIG. 2A, separate lobes of light 114 may enter the optical fiber 122 at different angles. As a result, the separate lobes of light 114 may have different path lengths and thus have different times for traversing the optical fiber 122. As shown in FIG. 2B, the separate lobes of light 114 may also rotate while reflecting along an interior surface of the optical fiber 122. As a result of these reflections, the separate lobes of the light 114 entering the optical fiber 122 may be scrambled and converge into the single lobe of light 124 after exiting the optical fiber 122.

While a single one of the optical fibers 122 is shown to intercept the two separate lobes of light 114, embodiments may also include more or less than two lobes of light entering separate optical fibers 122. The optical fibers 122 may also be placed in a near field or the far field of the multi-mode laser 110 to scramble the plurality of modes of light.

Figure 3:
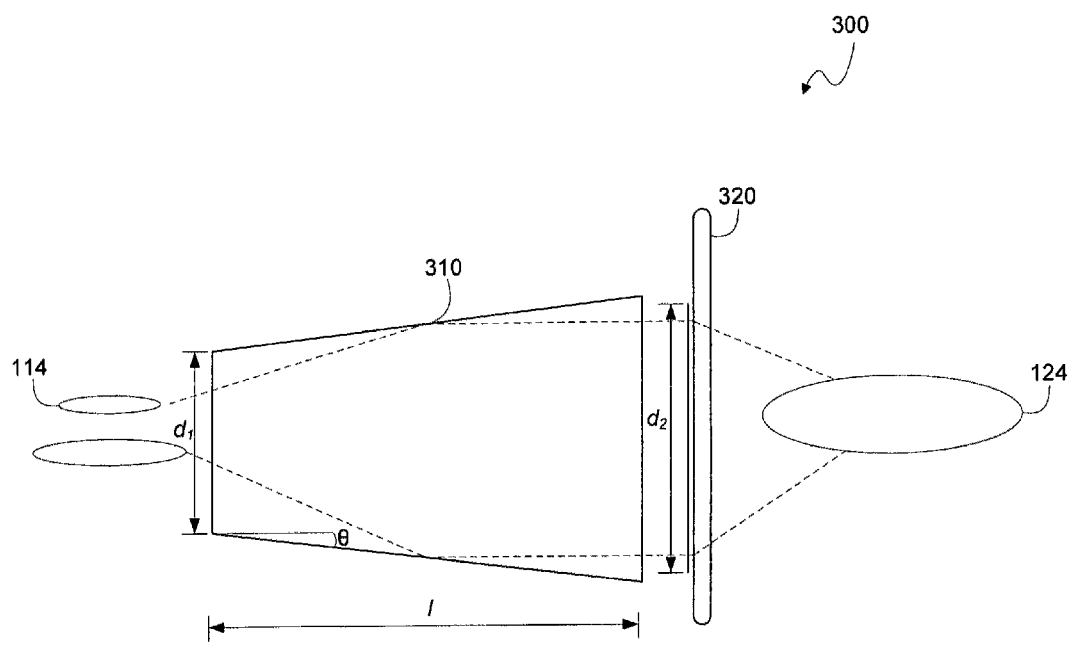
FIG. 3 is a diagram of a cross-sectional side view of another example diffuser.

FIG. 3 is a diagram of a cross-sectional side view of another example diffuser 300, where the optical diffuser 300 is interchangeable with the diffuser 120 shown in FIG. 1A. In this embodiment, the optical diffuser may include a single optical fiber 310, where a cross-sectional area or diameter $d_2$ of the second end may be greater than a cross-sectional area or diameter $d_1$ of the first end for the optical fiber 310. Thus, the optical fiber 310 may be tapered towards the first end. Further, a lens 320, such as a convex lens, may be arranged next to the second end of the optical fiber 310. The lens 320 may further converge or focus the reflected separate lobes of light 114 exiting the second end to form the single lobe of light 124 after passing through the lens 320. The separate lobes of light 114 may be reflected within the optical fiber 310 at least somewhat similar to the optical fiber 122.

Dimensions of the optical fiber 310, such as a slope angle θ, length l and the diameters $d_1$ and/or $d_2$, may be determined experimentally based on divergent angles of separate lobes of light 114 in the far field and/or according to a manufacturer or user's specifications. For example, in one embodiment, the slope angle θ may be 1 degree, the length l may be 3 mm and the diameter $d_1$ of the first end may be 100 μm.

Similar to the optical fiber 122, a cross-section of the optical fiber 310 may have various shapes, such as cylindrical. Further, while FIG. 3 only shows a single optical fiber 310 and/or diffuser 300, embodiments may include a plurality of the optical fibers 310 and/or diffusers 300 interfacing with multi-mode laser 110.

While the diffusers 120 and 300 have been shown to include optical fibers, embodiments may also other types of materials, such as thin film, optical glass, flashed opal, and the like.

Figure 4A:
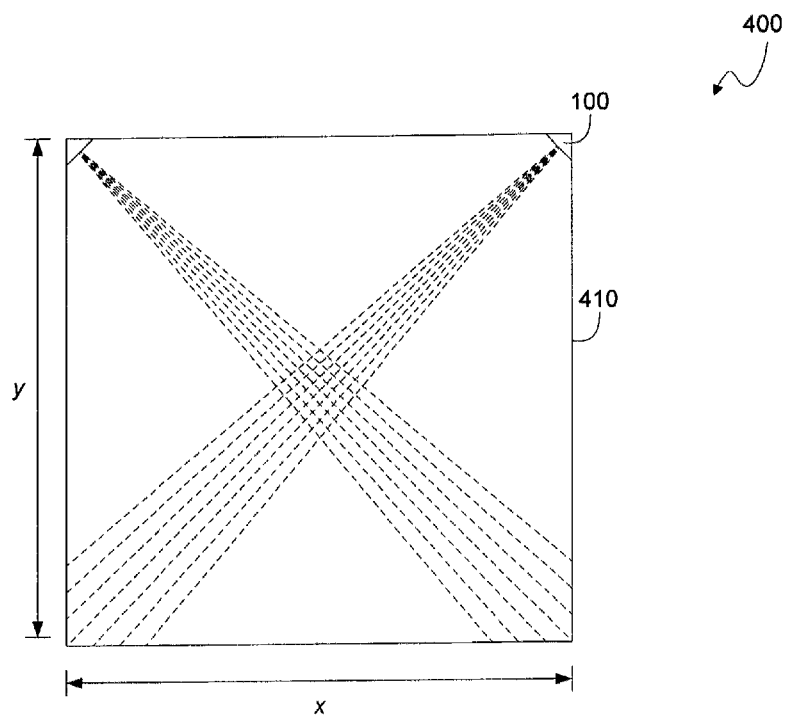
FIG. 4A is a block diagram of a top view of an example display system including the diffusing device of FIG. 1A.

FIG. 4A is a block diagram of a top view of an example display system 400 including the diffusing device 100 of FIG. 1A, where the diffusing device 100 may include the diffusers 120 and/or 300. In the embodiment of FIG. 4A, the display system 400 includes a display 410 to output an image and the diffusing device 100 to output the single lobe of light 124 parallel to a surface of the display 410. In FIG. 4A, two diffusing devices 100 are arranged at adjacent corners of the display 410 so as to create a grid of light across that generally covers a surface of the display 410 along the length x and width y directions. For example, part of the laser beams of the two diffusing devices 100 are shown to spread out across the display 410. However, embodiments may include more or less than two diffusing devices 100 arranged at different spaces. For example, in one embodiment, two diffusing devices 100 may be on opposite sides of the display 410.

The display 410 may include an integrated display device, such as a Liquid Crystal Display (LCD) panel or other type of display panel. The display 410 may also include one or more external display devices, such as an LCD panel, a plasma panel, a Cathode Ray Tube (CRT) display, or any other display device.

Figure 4B:
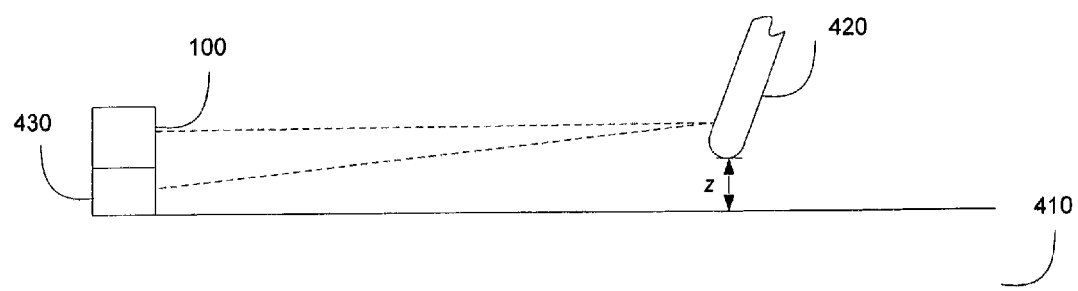
FIG. 4B is a block diagram of a side view of the example display system of FIG. 4A.

FIG. 4B is a block diagram of a side view of the example display system 400 of FIG. 4A. As shown in FIG. 4B, the display system 400 may also include a detector 430 and a marking object 420. The detector 430 may include a light detecting source, such as a camera. The marking object 420 may be any type of object being used to interact with the display 410, such as a user's finger, a writing utensil like a stylus and the like. While the detector 430 is shown to be below the diffusing device 100, embodiments may include the detector 430 to be placed at various other spaces that allow for detection of the reflected light, such as above, next to, adjacent to and/or across from the diffusing device 100.

As shown in FIG. 4B, the marking object 420 above the surface of the display 410 is to reflect the single lobe of light 124 emitted from the diffusing device 100. The marking object 420 is to move along and above the surface of the display 410 and may also reflect only part of the single lobe of light 124 parallel to a surface of the display 410 to the detector 430. The detector 430 is to then detect the reflected light. For example, the detector 430 may gather data relating to position and/or movement of the marking object 420 along various dimensions, such as the length x, width y, and height z, with respect to the display 410. This data may then be transmitted to a computing device (not shown) and/or a processor (not shown) to determine at least the height z or a distance between the marking object 420 and the surface of the display 430. In addition, the position of the marking object 120 along the length x and width y of the display 410 may also be determined by the computing device and/or the processor based on the data relating to the reflected light.

In an embodiment, the display system 400 may be connected to the computing device. Embodiments of the computing device 630 may include, for example, a desktop computer, a notebook computer, an all-in-one system, a slate computing device, a portable reading device, a wireless email device, a mobile phone, and the like.

Alternatively, the display system 400 may be connected to an external processor (not shown) or an internal processor of the computing device. The processor may be one or more central processing units (CPUs), semiconductor-based microprocessors, and/or other hardware devices suitable for retrieval and execution of instructions stored in a machine-readable storage medium (not shown).

Instructions for processing the gathered data may be stored in a machine-readable storage medium (not shown), which may be any electronic, magnetic, optical, or other physical storage device that contains or stores executable instructions. For example, the machine-readable storage medium may include handwriting or user-interface applications for determining the distance between the marking object 420 and the surface of the display 410 based on the reflected light.

The detector 430 may also detect an external light, the external light including transmitted and/or reflected light from a source other than the diffusing device 100. For example, the external light may include ambient visible light or non-visible light emitted by a source other than the diffusing device 100. The term light alone may include both the visible and non-visible light. The visible light may include a portion of the electromagnetic spectrum that is visible to the human eye and the non-visible light may include the portion of the electromagnetic spectrum that is not visible to the human eye.

The detector 430 may then communicate the additional data relating to the external light to the processor and/or computing device to further aid in determining the position of the marking object 420 with respect to the display 410, such as the height z, based on the detected external light. For example, the data based on the external light may be used by an imaging application to further identify the marking object 420 and clarify the height z.

These embodiments may more accurately determine the position or motion, such as in the height z dimension, of the marking object 420 with respect to the display 410 compared to a case when the laser beam has multiple lobes of light and/or non-homogenous transverse profiles in the far field.

FIG. 5 is a flowchart of an example method for diffusing light. In the embodiment of FIG. 5, at block 510, the plurality of modes of light are emitted from the multi-mode laser 110. Next, at block 520, the plurality of modes of light enter as the separate lobes of light 114 and are reflected within the optical fiber 122 or 300. The separate lobes of light 114 may rotate within the optical fiber 122 or 300 when reflected. Then, at block 530, the separate lobes of light 114 are output as the single lobe of light 124 having a homogeneous distribution of light.

Further, the single lobe of light 124 may be output across a surface of a display 410. Next, at least part of the single lobe of light 124 may be reflected by the marking object 420 positioned above the display 410. The marking object 420 may reflect only part of the single lobe of light 124 parallel to the surface of the display 410 to the detector 430.

Then, the detector 430 may detect at least part of reflected light. A processor or computing device may then determine a distance between the marking object 420 and the surface of the display 420 based on the reflected light, such as from data gathered by the detector 430.

As explained above the, optical fiber 122 or 300 may have various shapes and/or sizes. Further, for the optical fiber 300, which is tapered, the separate lobes of light 114 may be converged through the lens 310 before the outputting at block 530.

Additionally, intervening blocks not shown may be also employed in the above embodiments. Although a flowchart may describe the operations as a sequential process, many of the operations may be performed in parallel or concurrently.

According to the foregoing, embodiments disclosed herein provide a device and/or method to reduce or prevent a distortion of a laser beam of a multi-mode laser, by diffusing the laser beam through an optical fiber. Thus, the laser beam may be more accurately detected, for example, as a single lobe of light instead of a plurality of lobes of light, even at further distances, such as a far field or point along a surface of a display. Accordingly, the multi-mode laser may be used in various applications requiring more accurate detection of the laser beam at the far field, such as for three-dimensional motion sensing.

We claim:

1. A diffusing device, comprising:
a multi-mode laser to emit a plurality of modes of light; and
a diffuser to include an optical fiber having first and second ends, the plurality of modes of light to enter through the first end, wherein
the plurality of modes of light are to reflect within the diffuser, and
the reflected modes of light are to scramble into a single lobe of light after exiting the second end.

2. The diffusing device of claim 1, wherein,
the plurality of modes of light are to rotate within the optical fiber included in the diffuser, and
a cross-section of the optical fiber is at least one of polygonal, elliptical and irregular.

3. The diffusing device of claim 1, wherein the diffuser includes a plurality of the optical fibers arranged to protect and cover an emission surface of the multi-mode laser.

4. The diffusing device of claim 1, wherein the laser is to pulse the plurality of modes of light at a frequency of at least 10 picoseconds and at a power greater than 100 milliwatts.

5. The diffusing device of claim 1, wherein,
a cross-sectional area of the second end is greater than that of the first end, and
a length, a diameter, and a slope of the optical fiber included in the diffuser is based on a divergent angle of the plurality of modes of light.

6. The diffusing device of claim 5, further comprising:
a lens next to the second end of the optical fiber, wherein the plurality of modes of light are to form a single lobe of light after passing through the lens.

7. The diffusing device of claim 1, wherein,
the multimode laser includes a diode and the plurality of modes of light are emitted perpendicular to a surface of the diode, and
a null space is to form between the plurality of modes of light in the far field.

8. A diffuser system, comprising:
a display to output an image;
the diffusing device of claim 1 to output the single lobe of light parallel to a surface of the display;

a marking object above the surface of the display to reflect the single lobe of light;

a detector to detect the reflected light; and a processor to determine a distance between the marking object and the surface of the display based on the reflected light.

9. The diffuser system of claim 8, wherein the marking object is to move along and above the surface of the display, the marking object to reflect only part of the single lobe of light parallel to a surface of the display to the detector.

10. The diffuser system of claim 8, wherein, the detector is to further detect an external light, the external light including at least one of transmitted and reflected light from a source other than the laser, and the processor is to further determine a distance between the marking object and the surface of the display based on the detected external light.

11. A method for diffusing, comprising:

projecting a plurality of modes of light from a multi-mode laser;

reflecting the plurality of modes of light within an optical fiber included in a diffuser; and outputting the reflected modes of light as a single lobe of light having a homogeneous distribution of light.

12. The method of claim 11, further comprising:

outputting the single lobe of light across a surface of a display;

reflecting at least part of the single lobe of light with a marking object positioned above the display;

detecting at least part of reflected light; and determining a distance between the marking object and the surface of the display based on the reflected light.

13. The method of claim 12, wherein the marking object reflects only part of the single lobe of light parallel to the surface of the display.

14. The method of claim 11, wherein, the reflecting includes rotating the plurality of modes of light within the optical fiber included in the diffuser, and a cross-section of the optical fiber is at least one of polygonal, elliptical and irregular.

15. The method of claim 14, wherein the optical fiber is tapered.

16. The method of claim 15, further comprising:

converging the reflected modes of light through a lens before the outputting.

\* \* \* \* \*